United States Patent [19]
Keidl

[11] 4,255,693
[45] Mar. 10, 1981

[54] CLOSED LOOP STEPPER MOTOR CIRCUITRY WITHOUT ENCODER

[75] Inventor: Steven D. Keidl, Rochester, Minn.

[73] Assignee: International Business Machines Corporation, Armonk, N.Y.

[21] Appl. No.: 89,324

[22] Filed: Oct. 29, 1979

[51] Int. Cl.³ .............................................. G05B 19/40
[52] U.S. Cl. .................................... 318/685; 318/696; 318/721
[58] Field of Search ............... 318/685, 696, 314, 608, 318/721, 722, 723

[56] References Cited

U.S. PATENT DOCUMENTS

| | | | |
|---|---|---|---|
| 3,601,678 | 8/1971 | Vestal et al. | 318/685 |
| 3,660,747 | 5/1972 | Kruer et al. | 318/696 |
| 3,684,934 | 8/1972 | Loyzim | 318/696 |
| 4,065,708 | 12/1977 | Ulland et al. | 318/685 |
| 4,119,901 | 10/1978 | Leenhouts | 318/685 |

OTHER PUBLICATIONS

A. C. Leenhouts et al., "An Active Stabilization Technique for Open Loop PM Step Motor Drive Systems", May 24–27, 1977, from Proceedings Sixth Annual Symposium, University of Illinois.
G. Singh, "On Current Detection in Variable Reluctance Step Motors", May 24–27, 1977, from Proceedings Sixth Annual Symposium, University of Illinois.

*Primary Examiner*—B. Dobeck
*Attorney, Agent, or Firm*—Keith T. Bleuer

[57] ABSTRACT

Stepper motor control circuitry including a phase locked loop circuit formed by a phase detector outputted to a filter and a voltage controlled triangular and square wave generator which has a frequency control input terminal connected to the output of the filter and which provides a square wave on an output thereof connected as an input to the phase detector. An oscillator drives the phase detector, and the outputs of the generator are connected as inputs to a pulse width modulated driver which has its outputs connected to the coils of the stepper motor. A differential amplifier is connected across one of the coils of the motor, and a balanced modulator synchronous detector or multiplier has two inputs one of which constitutes an output of the differential amplifier and the other of which is a connection to the square wave output of the generator. The output of the multiplier constitutes an error signal which is supplied to a summing junction between the filter and generator so that, upon the application of an instantaneous load to the stepper motor, the error signal causes a very quick return to normal speed of the motor.

15 Claims, 16 Drawing Figures

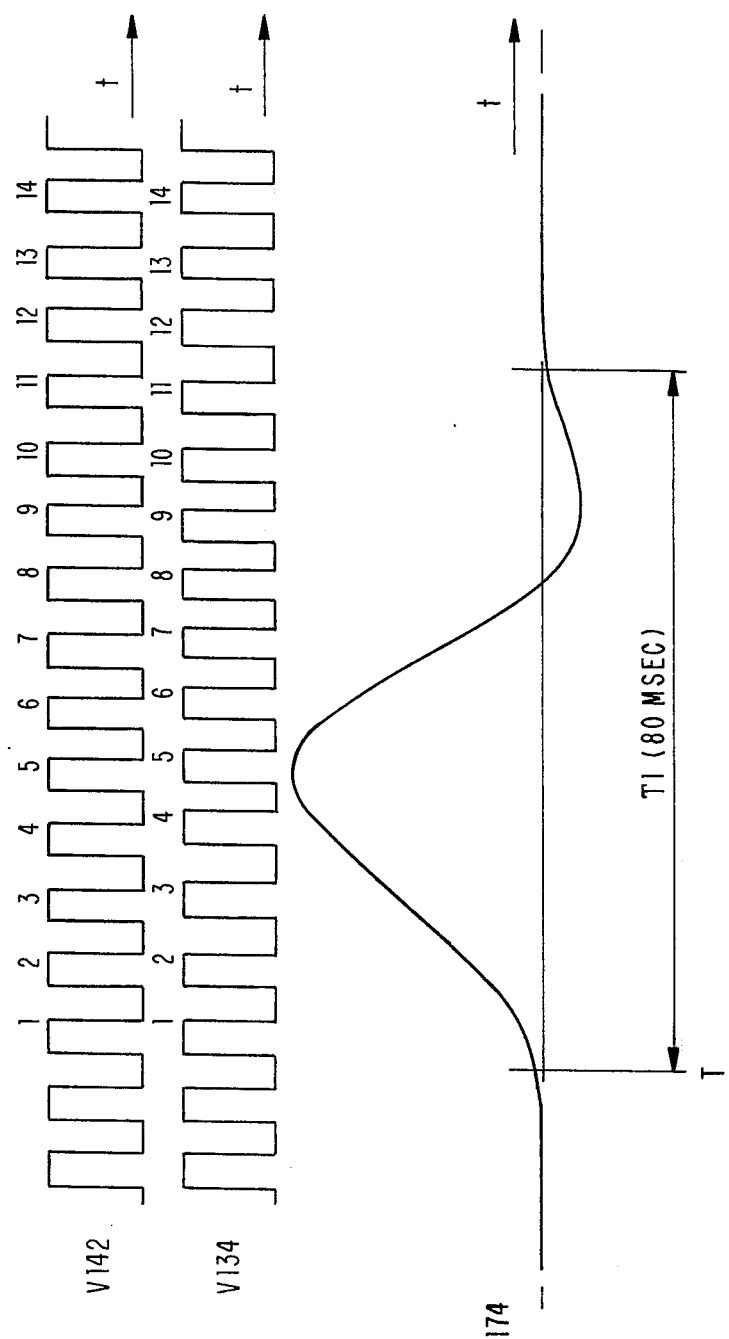

CLOSED LOOP STEPPER MOTOR CIRCUITRY WITHOUT ENCODER

BACKGROUND OF THE INVENTION

The invention relates to electrical stepper motors and more particularly to circuitry for controlling such motors for holding the stepper motor armature speeds substantially uniform without the necessity of utilizing an encoder driven by the stepper motor.

An electrical stepper motor, which is a device designed for positional accuracy, may be used in a high accuracy constant speed mode, such as for driving magnetic disks either of the rigid or flexible type. Some advantages of using an electrical stepper motor in this manner are: relatively low cost, small size, and absolute long term speed accuracy since the stepper motor is a synchronous device. For driving magnetic disks, an electrical stepper motor is most attractive when used in a direct drive configuration, by directly coupling the motor armature through a spindle with the magnetic disk. Start-stop and zoned speed modes of operation are possible. With such a direct drive, belts and pulleys are eliminated, the size of the magnetic disk file machine as a whole is reduced, and reliability is increased. The reduction of the size of the file machine comes about not only because of belt and pulley elimination but also because of a physical motor size reduction. The latter is due to the increased motor efficiency over present A.C. motor pulley belt systems.

A directly coupled arrangement of the electrical stepper motor with a spindle carrying a magnetic disk also has some disadvantages. The torque variation on the motor armature versus the position of the armature gives rise to large instantaneous speed variations (5-10 percent) when using classical digital drive techniques. This problem has been eliminated through the use of a mini step PWM (PULSE WIDTH MODULATION) type motor driver which, in effect, supplies the motor with a current related to armature position. This forces a constant armature torque versus position characteristic and greatly reduces the torque ripple of the armature. Use of this driving technique has resulted in instantaneous speed variations under 0.75 percent peak to peak. Most non direct drive systems for stepper motors cannot approach this tolerance. The other problem to be solved is poor motor spindle armature response to step load variations. For example, the instantaneous torque load transient response is especially poor in an open loop spindle system which does not utilize an encoder driven by the motor armature for feedback.

Using such prior approaches without feedback, when the stepper motor has a step change in load torque applied to it such as when a transducer is applied onto a magnetic disk driven by the motor, the motor responds in a highly underdamped fashion. In a typical flexible magnetic disk direct drive application, the head load mechanism may, for example, apply a 50 gram step load to the disk surface. The motor responds by oscillating about the desired speed for a substantial time, with the speed of the motor gradually leveling off at its proper value; however, the result is that data cannot be read from the magnetic disk for one or more seconds after the magnetic head or transducer has been applied into contact with the disk. In the past, the only effective electrical way to eliminate the problem and maintain fast response has been to add an encoder to the disk spindle to thus make the drive a closed loop system with the encoder providing a feedback. This approach, although it functions well, greatly increases the cost of the machine and increases its size.

Some past approaches have also attempted to isolate the back EMF voltage produced by the motor for providing an error signal usable in lieu of an encoder signal; however, such isolation resulted in complexity of the circuitry and increased cost.

SUMMARY OF THE INVENTION

It is an object of the present invention to provide improved stepper motor control circuitry which realizes the advantages of a feedback approach for maintaining the motor speed uniform without the use of an encoder driven by the motor.

More particularly, it is an object of the invention to provide such encoderless stepper motor control circuitry utilizing the position information present in the motor voltage wave form, which is the sum of the voltage impressed on the motor coils and the back EMF voltage produced by the motor. Still more particularly, it is an object to provide such circuitry which measures the phase difference between the back EMF and the drive voltage without their separation so as to provide an error voltage that maintains the motor speed substantially constant without the use of a motor driven encoder.

In a preferred form, the circuitry of the invention includes a phase locked loop which is driven by a clock oscillator and includes the usual phase detector, filter and voltage controlled oscillator, a two phase bridge driver controlled by the loop and applying voltages to the coils of the stepper motor, a difference amplifier connected across one of the motor coils and providing along with the signal applied to the phase detector in the phase locked loop a pair of inputs to a balanced modulator synchronous detector which multiplies these two signals applied to it. The output of the balanced modulator synchronous detector is an error signal which is applied to a summing junction between the filter and the voltage controlled oscillator of the phase locked loop for thus holding the speed of the motor armature substantially constant regardless of the application of instantaneous loads to the motor.

BRIEF DESCRIPTION OF THE DRAWINGS

FIG. 3A is placed above FIG. 3B, constitute a diagram of a pulse width modulated two-phase bridge driver constituting a part of the circuitry of FIG. 2;

FIGS. 5, 6, 7 and 8 are timing diagrams showing various voltages and currents in the FIG. 2 circuitry;

DESCRIPTION OF THE PREFERRED EMBODIMENT

Figure 1:
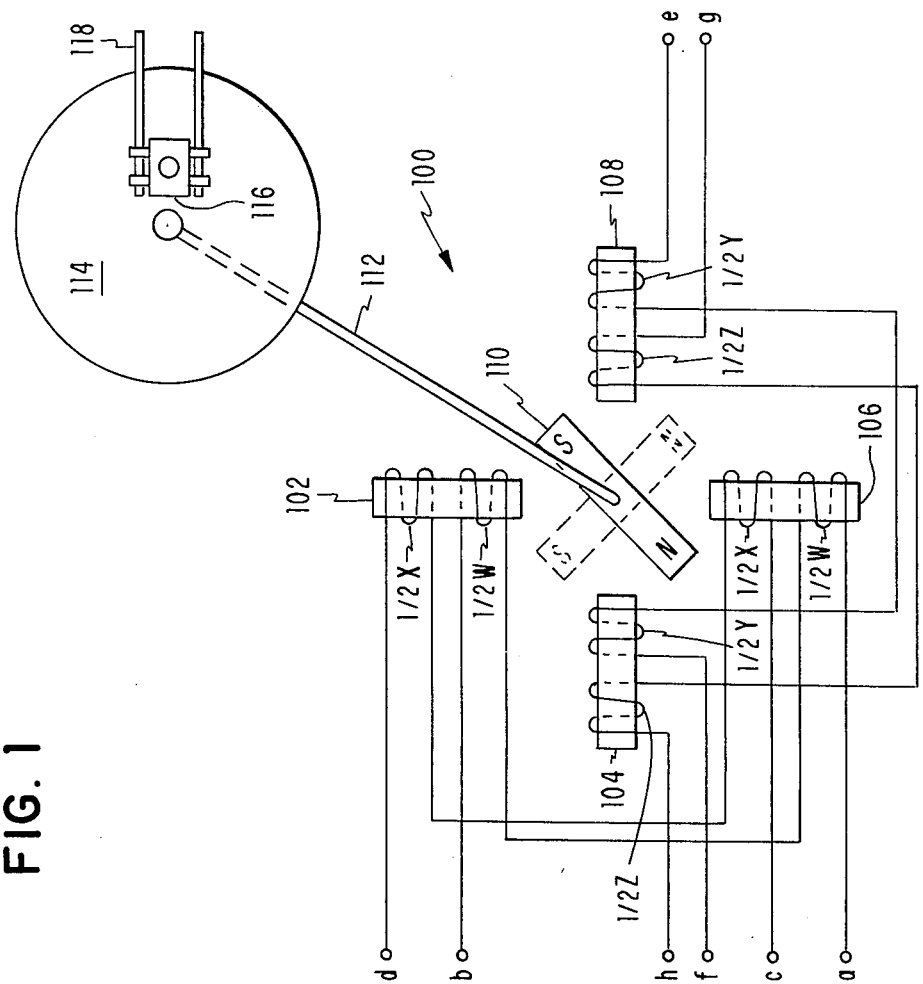
FIG. 1 is a diagrammatic illustration of an electrical stepper motor which may be controlled by the circuitry of the invention.

The electrical stepper motor 100 as schematically shown in FIG. 1 includes poles 102, 104, 106 and 108 disposed at 90 degrees with respect to each other and an armature 110 centrally located with respect to the inner ends of the poles. Windings or coils W, X, Y and Z are disposed with halves of them on various of the poles. Halves of the windings W and X are on the opposite poles 102 and 106, and halves of the windings Y and Z are on the opposite poles 104 and 108. The winding halves are connected as shown in FIG. 1, and the connections have terminals a-h.

The armature 110 as shown schematically constitutes a single bar having permanent north and south poles on its opposite ends and rotatably disposed by means of a spindle 112. A magnetic disk 114 is fixed on the spindle 112, and a transducer 116 is provided that makes contact with a face of the disk 114. The transducer 116 is loaded and unloaded onto the disk and is supported by means of any suitable mechanism including guide rods 118. It will be understood that the showing of the stepper motor 100 in FIG. 1 is just symbolic of real, conventional, permanent magnet stepper motors and does not constitute a full showing of such a motor.

Figure 2:
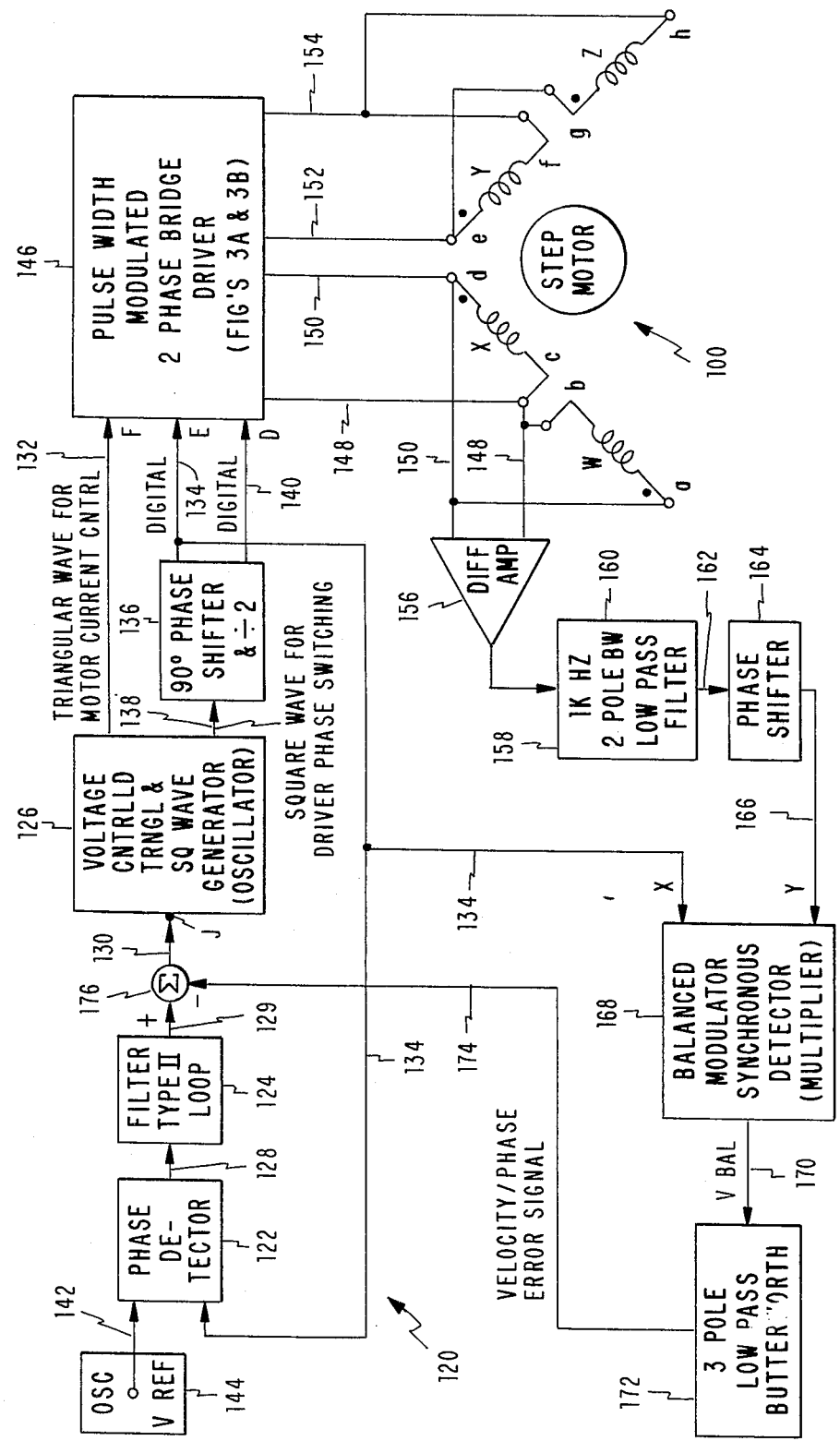
FIG. 2 is a diagram of the stepper motor controlling circuitry of the invention.

The circuitry for controlling the motor 100 as shown in FIG. 2 includes a phase locked loop 120. The loop 120 includes the conventional phase detector 122, type II filter 124 and voltage controlled triangular and square wave oscillator or generator 126. Leads 128, 129 and 130 connect the circuits 122, 124 and 126 together, and the oscillator 126 has two output leads 132 and 138. The lead 138 is connected with a 90 degree digital phase shifter and divide by two circuit 136 which has the output leads 134 and 140. The lead 134 constitutes an input to the phase detector 122 and completes the loop 120. The phase detector 122 has a second lead 142 as an input which constitutes the output of a crystal oscillator 144.

The leads 132, 134 and 140 are respectively connected to terminals F, E and D on a PWM (pulse width modulated) two phase bridge driver which is shown in some detail in FIGS. 3A and 3B and will be described in more detail hereinafter. The driver 146 has output leads 148, 150, 152 and 154 connected to motor terminals a-h as shown in FIG. 2, with the windings W and X connected across the leads 148 and 150 and the windings Y and Z connected across the leads 152 and 154.

A difference amplifier 156 has the leads 148 and 150 as inputs and has an output lead 158 by means of which it is connected to a two pole Butterworth low pass filter 160. The filter 160 has an output lead 162 which is connected as an input to a 90 degree analog phase shifter 164, and the lead 166 constitutes the output of the shifter 164 and an input to a balanced modulator synchronous detector or multiplier 168. The detector 168 also has the lead 134 as a second input. The synchronous detector 168 has the lead 170 as an output which constitutes an input to a three pole low pass Butterworth filter 172. The output of the filter 172 is a lead 174 that is connected as an input to a summing junction 176 disposed between leads 129 and 130.

The phase locked loop 120 is quite conventional, and its components and operation are described in a number of treatises, such as the volume, "Phase Locked Loops" by Alain Blanchard, published by John Wiley and Sons, copyrighted 1976. As described in this volume, for example, the phase locked loop is a device by means of which the phase of an output signal from a generator or oscillator (such as on lead 134) is obliged to follow that of the input signal (such as on lead 142 from oscillator 144). The input signal (on line 142) and the output from the oscillator (126) are applied as inputs to the phase detector (phase detector 122) the output of which is a function of the phase difference between the two signals applied. This error voltage (on lead 128) after low pass filtering in the loop filter (filter 124) is applied to the frequency control input terminal (J) of the voltage controlled oscillator (oscillator 126) in such a way that the oscillator signal phase must follow the input signal phase. The principles by means of which the phase detector 122, the filter 124 and the generator 126 may be designed are described fully in this Blanchard volume, for example.

Figure 3A:
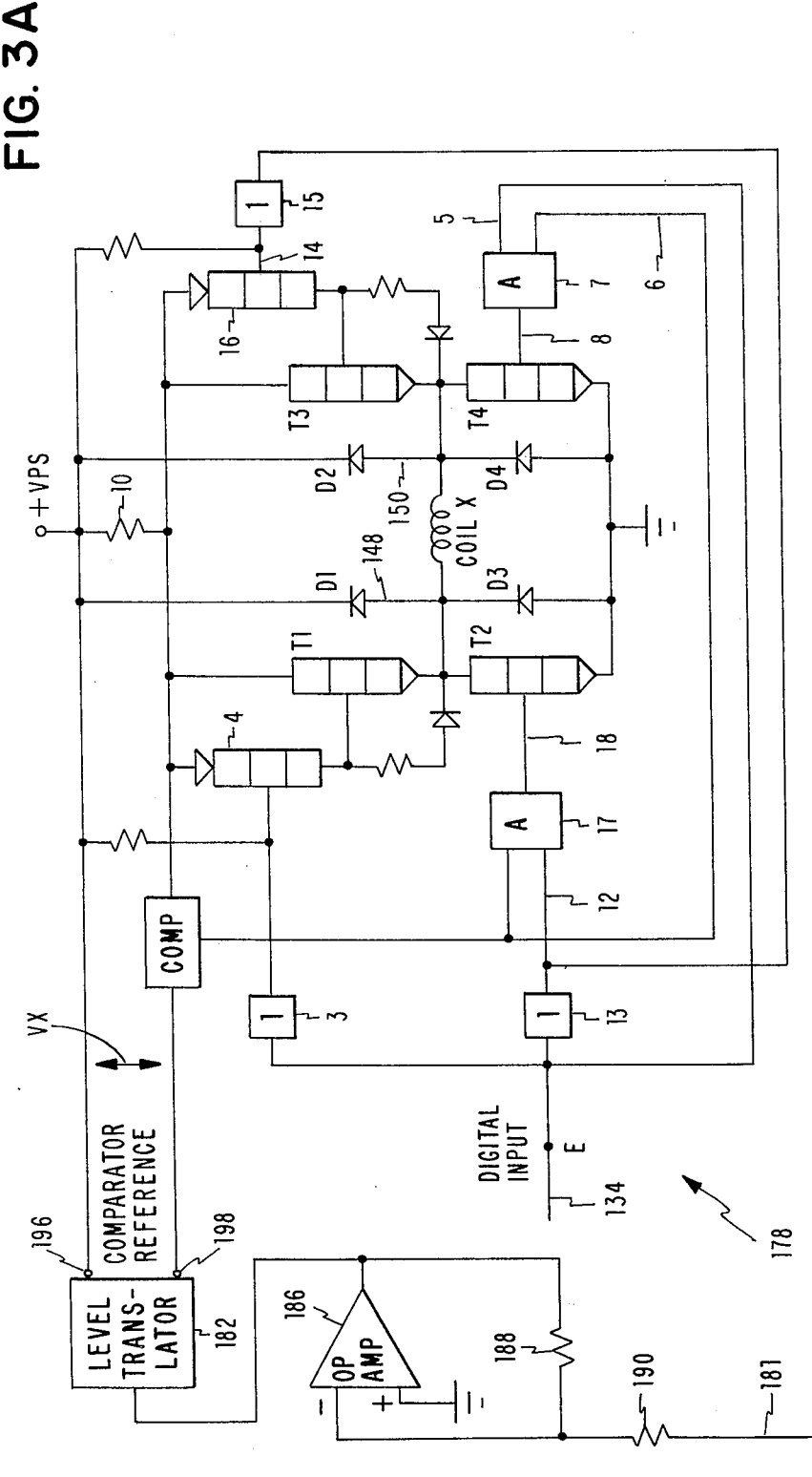
FIGS. 3A and 3B, when
Figure 3B:
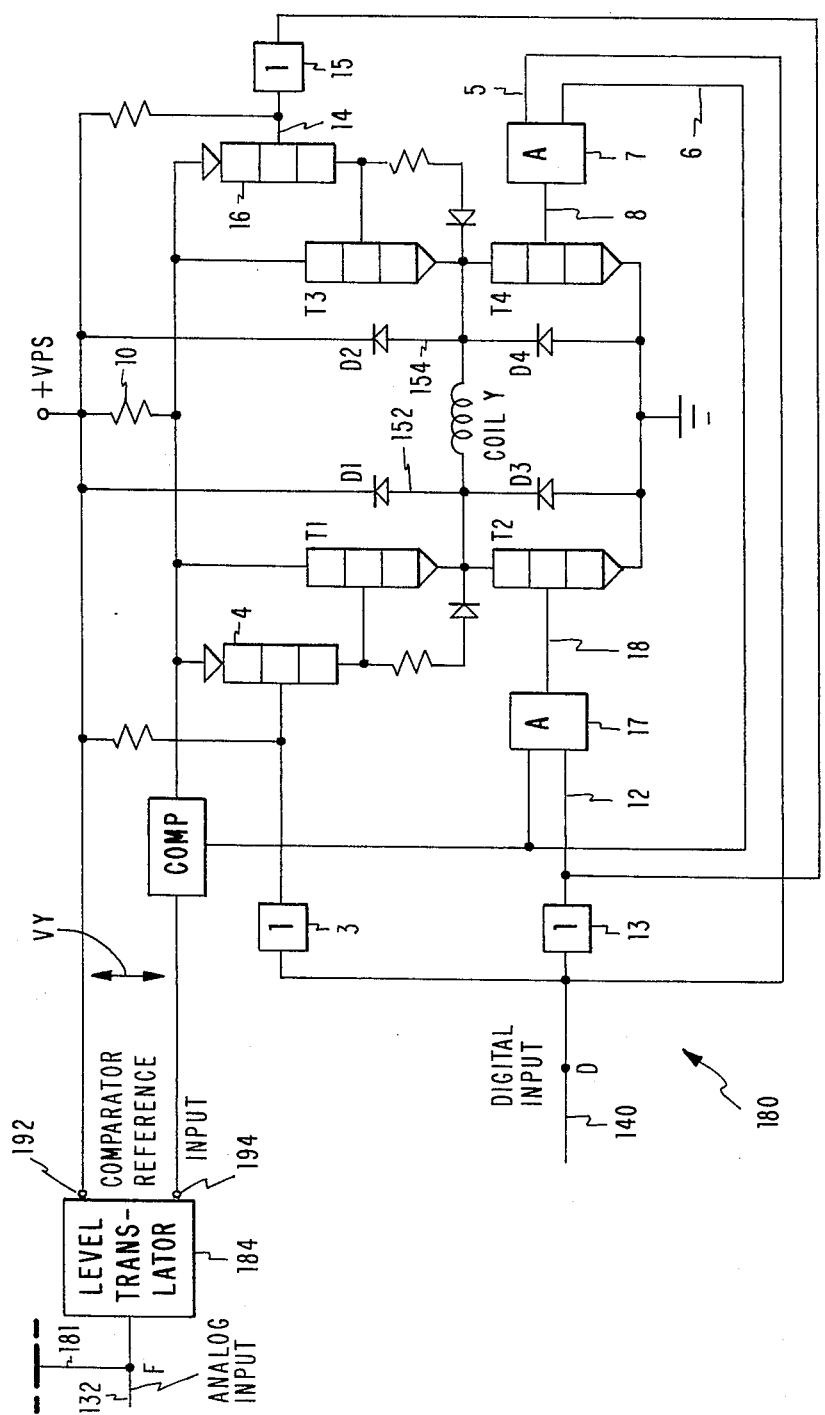

The PWN two phase bridge driver 146 includes the two circuits 178 and 180 and is shown in detail in FIGS. 3A and 3B (with the circuit 178 of FIG. 3A being disposed above and connected by lead 181 with the circuit 180 of FIG. 3B). Each of the circuits 178 and 180 is substantially identical with the circuit shown in FIG. 1 of U.S. Pat. No. 3,812,413, and the same reference characters are applied onto the components of the circuits 178 and 180 as are used in connection with the circuit of FIG. 1 of U.S. Pat. No. 3,812,413. The circuit 178 is used in connection with the coil X (and thus also in connection with the coil W which is in parallel with the coil X). Likewise, the circuit 180 is used in connection with the coil Y (and thus in connection with the coil Z which is in parallel with the coil Y). The leads 148, 150, 152 and 154 are thus indicated in FIGS. 3A and 3B as well as in FIG. 2. As shown in FIGS. 3A and 3B, the terminals D and E respectively constitute, "digital in" inputs to the circuits 180 and 178.

As shown in FIGS. 3A and 3B, the bridge driver 146 also includes the level translators 182 and 184 connected with the terminal F and line 132. The connection of the terminal F with the translator 184 is direct, while the connection between the terminal F and the translator 182 is by means of an operational amplifier 186 functioning as an analog inverter. Resistors 188 and 190 are used in connection with the amplifier 186. The translator 184 has the output terminals 192 and 194 between which there is a reference voltage $V_Y$, and the translator 182 has the output terminals 196 and 198 between which there is the reference voltage $V_X$.

The difference amplifier 156 is constructed according to conventional principles and provides an output voltage on its output lead 158 which is equal to the difference between the two input voltages on the leads 148 and 150.

The balanced modulator synchronous detector 168 is also a conventional circuit to deliver an output (on lead 170) which is proportional to the product of the input voltages (on leads 166 and 134).

In operation, the circuitry provides a velocity/phase error signal on lead 174 that modifies the operation of the phase locked loop 120 so that the speed of the armature 110 remains substantially at the speed determined by the oscillator 144 even though sudden loads are applied onto the disk 114 as by moving the transducer 116 into engagement with the disk 114.

Figure 4:
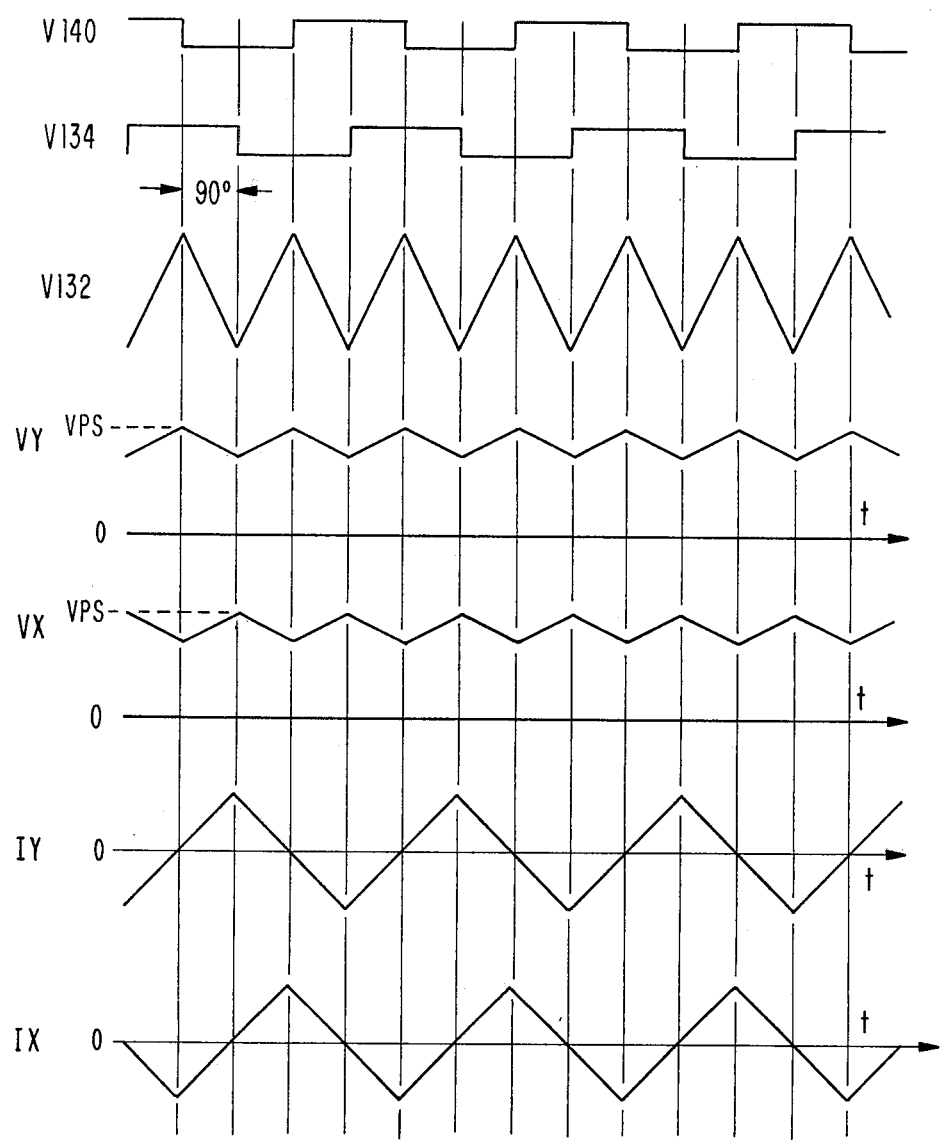
FIG. 4 is a timing diagram showing various voltages and currents in connection with the driver of FIGS. 3A and 3B.

An optimum current wave form may be found for minimum velocity ripple of the armature 110 and thus of the disk 114. For a particular motor, this may be a triangular waveform. The generator 126 has thus been constructed to provide the triangular analog input voltage $V_{132}$ shown in FIG. 4 (at terminal F) applicable to the illustrated motor for motor current control. At the same time, the generator 126 through the phase shifter 136 provides the digital voltages $V_{140}$ and $V_{134}$ (respectively on terminals D and E) which are applied to the circuit portions 180 and 178 respectively for the coils V and X for switching currents through these coils. In connection with the digital voltages $V_{140}$ and $V_{134}$, the circuits 178 and 180 function to supply voltage and current to the coils X and Y as described in said U.S. Pat. No. 3,812,413. The reference voltages $V_Y$ and $V_X$ are shown in FIG. 4, along with the associated coil currents $I_Y$ and $I_X$ respectively in windings Y and X.

Figure 5:
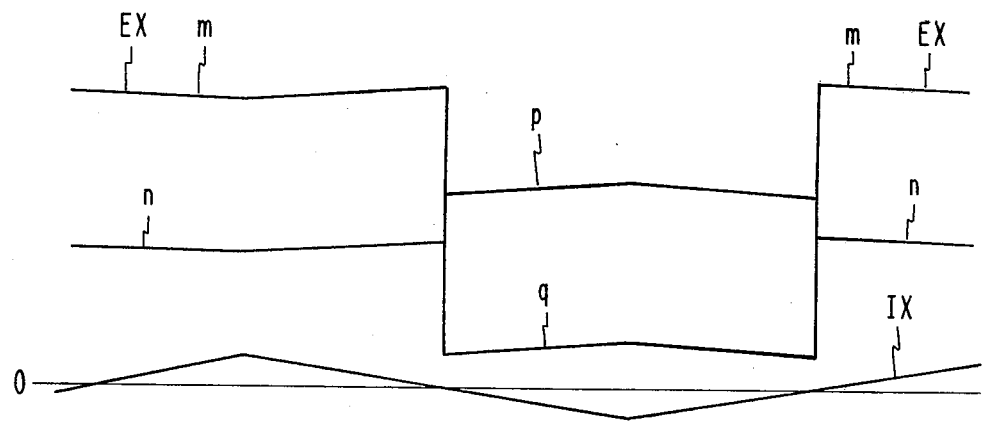
Figure 6:
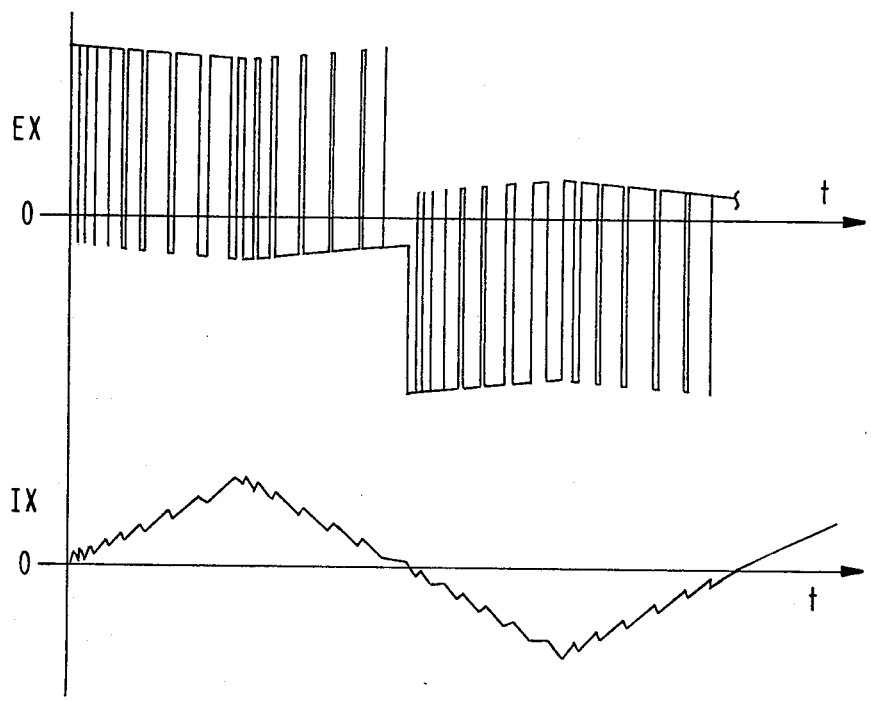
Figure 7:
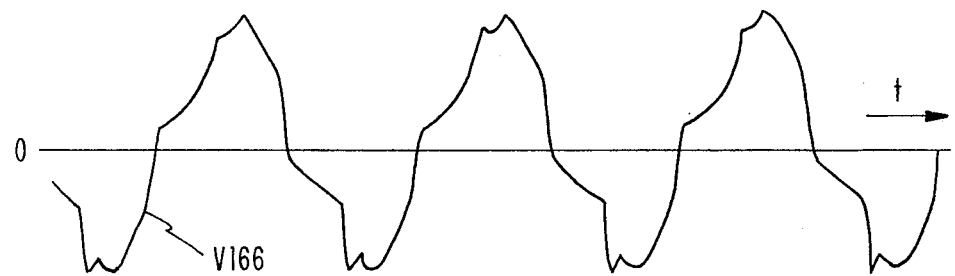

The voltage ($E_X$) across the winding X is shown with respect to the current $I_X$ in FIG. 5 and in greater detail but out of time scale in FIG. 6 and oscillates first between limits m and n and then between limits p and q. The voltage wave form $E_X$ is the result of the pulse width modulator 146 maintaining the current $I_X$. The change from the limits m-n to p-q is an illustration of the change of direction of current through winding X, and the voltage oscillations are simply the result of the conventional operation of the pulse width modulated driver 146. The voltage $E_Y$ and current $I_Y$ are generated in the same way as $E_X$ and $I_X$ but are time shifted 90°. The driver 146, as will be apparent particularly from U.S. Pat. No. 3,812,413 and a consideration of FIGS. 3A and 3B will thus switch the currents through windings W, X, Y and Z to drivingly rotate the armature 110 and disk 114. The voltage $E_X$ across the winding X is measured by the difference amplifier 156, and the voltage on the line 158 is the same as the voltage $E_X$ but reduced in amplitude. The voltage on line 158 is filtered by two-pole low pass filter 160 and is then phase corrected by phase shifter 164 and results in the voltage $V_{166}$ on lead 166 shown in FIG. 7. The phase shifter 164 is adjusted such that the voltage $V_{166}$ on line 166 and the voltage $V_{134}$ (see FIG. 8) on line 134 are 90° out of phase as required for maximum output from the balanced modulator 168. The voltage $V_{166}$ (see FIG. 7) is a filtered representation of the voltage across winding X ($E_X$) and includes two components. One component of voltage $E_X$ (shown in FIGS. 5 and 6) is due to the voltage applied by driver 146 to coil X, and the other component is the back EMF of coil X which is of the general form of a sine wave. There is a definite phase relationship between these components, and the change in phase of these components is in effect measured by the synchronous detector 168. This phase relationship is used to advance or retard the phase of the drive voltage to the motor 100 (on terminal J) to maintain its constant speed.

For a very approximate analysis, the filtered motor voltage $V_{166}$ may be:

$$V_{166}=K_2 \text{ SIN }(\omega t)+K_3 \text{ SIN }(\omega t+\theta) \quad (1)$$

The first term $K_2$ SIN ($\omega t$) is the voltage impressed by the driver 146 on coil X, and the second term $K_3$ SIN ($\omega t+\theta$) is the back EMF generated by the motor 100 in coil X. $\theta$ represents the phase difference between the back EMF of coil X and the voltage applied by driver 146 to coil X.

The synchronous detector 168 also has digital drive square wave voltage $V_{134}$ on lead 134 (see FIG. 8) applied to it, and the fundamental of this is:

$$V_{134}=K_1 \text{ COS }(\omega t) \quad (2)$$

The modulator 168 performs the multiplication of these two input signals yielding:

$$V_{170} = \frac{K_1 K_2}{2} \text{ SIN }(2\omega t) + \frac{K_1 K_3}{2} \text{ SIN }(2\omega t + \theta) + \frac{K_1 K_3}{2} \text{ SIN}\theta \quad (3)$$

The Butterworth filter 172 removes the first two terms of the above equation leaving:

$$V_{174} = \frac{K_1 K_3}{2} \text{ SIN}\theta \quad (4)$$

For low phase differences between the voltage from driver 146 and the back EMF on coil X, which is the case for low torque motor loading, this is just:

$$V_{174} = \frac{K_1 K_3}{2} \theta \quad (5)$$

The voltage $V_{174}$ is the error signal which is applied to the summing junction 176 so as to change the frequency of the voltage applied to the coil X (and likewise to the coils W, Y and Z), and it will be noted that there was never any separation of the drive and back EMF voltages in detecting and providing this error signal. In fact, if somehow there could have been such a separation so that only the back EMF on coil X is fed to the balanced modulator 168, the result would still be:

$$V_{174} = \frac{K_1 K_3}{2} \theta \quad (6)$$

The error voltage $V_{174}$ is applied by means of the summing junction 176 to modulate the phase/frequency of the drive to the motor 100. Since the motor speed is crystal clock controlled for accuracy from the crystal oscillator 144, the feedback is applied inside the phase locked loop 120. In order to reduce the number of parts required, the phase locked loop and the motor driver triangular wave current generator are combined in the voltage controlled generator 126.

During normal operation with no torque load variations, there is a zero phase difference between the voltage $V_{134}$ and the reference clock voltage $V_{142}$ (see FIG. 8). When a torque load occurs on the armature 110 as by means of transducer 116 applied onto disk 114, the synchronous detector 168 immediately puts out a large error signal ($V_{174}$) on lead 174 indicating that the motor armature 110 has slowed with respect to the drive waveform $E_X$ on coil X. This signal on lead 174 applied to the phase locked loop 120 causes the output of the loop on the lead 132 to immediately lag the clock signal from oscillator 144 on lead 142, electronically damping the stepmotor classical underdamped response to the step load change. The motor oscillator quickly damps out; the phase difference between the back EMF and the drive EMF on coil X goes to the new steady state value necessary to accommodate the increased friction of the head loaded disk; and the loop 120 returns to normal with the voltage $V_{134}$ and voltage from the clock oscillator $V_{142}$ in phase. During the correction time, because of its time constant, the output of filter 124 is essentially unchanged.

FIG. 8 may be referred to for a more detailed understanding of the manner in which the phase locked loop 120 is effective to maintain the speed of the armature 110 substantially constant even with the application of the transducer 116 on the disk 114 tending to slow the disk 114 and excite the classical stepper motor second order response. The voltage $V_{142}$ and $V_{134}$ on leads 142 and 134 are both square waves; and before the application of the transducer 116 to the disk 114 (at time T), the voltage waves $V_{134}$ and $V_{142}$ are in phase. At the time T, the time periods between successive voltage changes of voltage $V_{134}$ become longer, and the voltage changes of the voltage $V_{134}$ occur subsequent to the corresponding voltage changes of the voltage $V_{142}$. At the time T, the error signal voltage $V_{174}$ increases abruptly, and the resultant voltage on lead 130 momentarily decreases the instantaneous frequency of the oscillator 126 so as to tend to bring the voltage changes of the voltage $V_{134}$ again back into phase with the changes in the voltage $V_{142}$ in the shortest possible time. This is electronic damping. Eventually the changes of the voltages $V_{134}$ and $V_{142}$ are again in register, indicating that the speed of the armature 110 and disk 114 is again equal to the original speed. The correction time after time T in which the voltages $V_{134}$ and $V_{142}$ are not in phase can be relatively short, such as on the order of 80 milliseconds, as is indicated in FIG. 8.

The FIG. 2 circuitry realizes the advantages of a feedback approach without the requirement of using an encoder. It operates by utilizing the position information present in the motor voltage wave form. This wave form ($E_X$, see FIGS. 5 and 6) is the sum of the voltage impressed on the motor winding X by the driver 146 and the back EMF voltage produced by the motor and on the winding X. Past approaches have tried to isolate and process the back EMF for feedback, and the disclosed approach constitutes a method to measure the phase difference between the back EMF and the drive voltage without their separation. No adjustments are necessary; no encoder is required; and, under conditions of no torque load variation, the system operates as if it were open loop (without an encoder). Under transient conditions (high frequency perturbations in the frequency domain), the feedback loop 120 operates to return the armature speed to that set by the external clock 144 in the shortest possible time.

The disclosed open loop stepper system can be thought of as a feedback system with infinite "DC" gain since it must, on the average, run at the speed set by the frequency of its excitation (oscillator 144). At high frequencies, it has very low gain; and the instantaneous speed can vary considerably in response to load torque variations. The back EMF feedback system disclosed provides the high frequency gain to eliminate these transient variations. This closed loop control is accomplished by lead angle modulation of the pulse width modulated driver wave forms in response to the detected phase change between back EMF and applied drive voltage.

Figure 9:
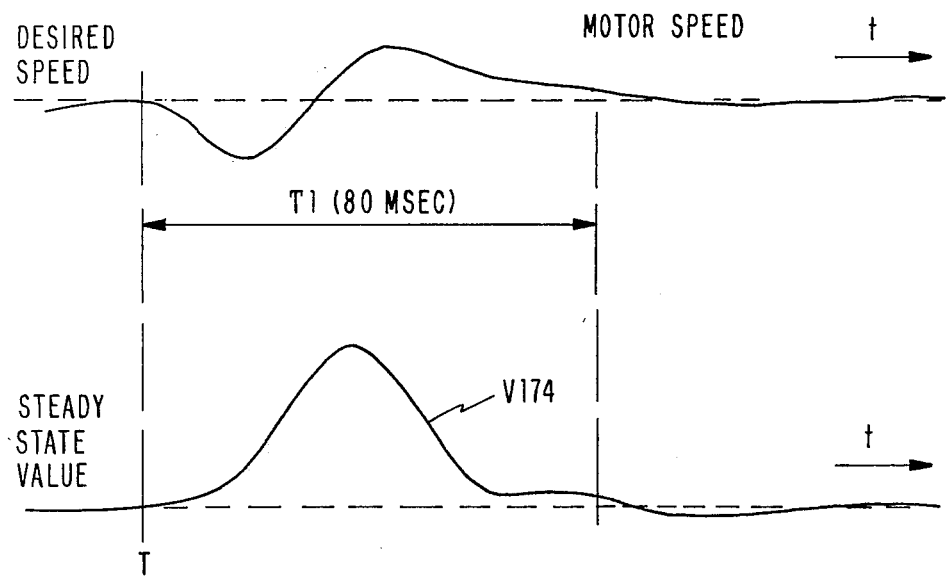
FIG. 9 is a diagram showing the relationship between the stepper motor armature speed and a certain voltage in the FIG. 2 circuitry.
Figure 10:
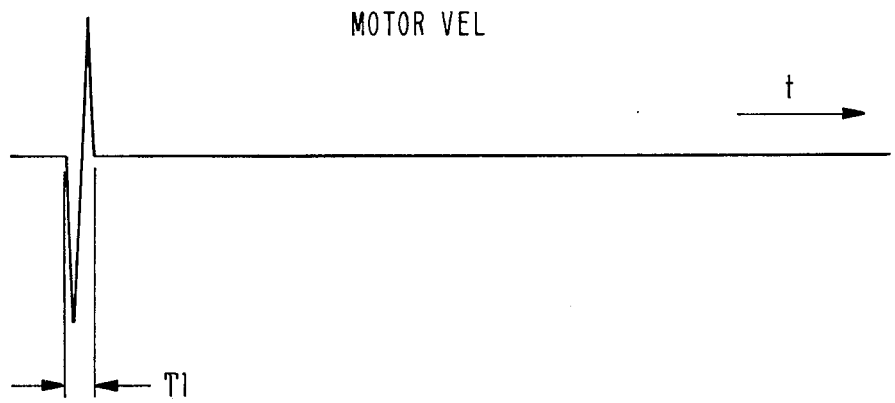
FIG. 10 is a timing diagram showing the manner in which the velocity of the armature of the stepper motor varies when a transducer is applied onto an attached magnetic disk using the FIG. 2 circuitry and FIG. 11 is a similar diagram and on the same time scale showing the manner in which the velocity of the armature and disk vary in ordinary open loop operation (without the FIG. 2 circuitry) upon the application of a transducer to the magnetic disk.
Figure 11:
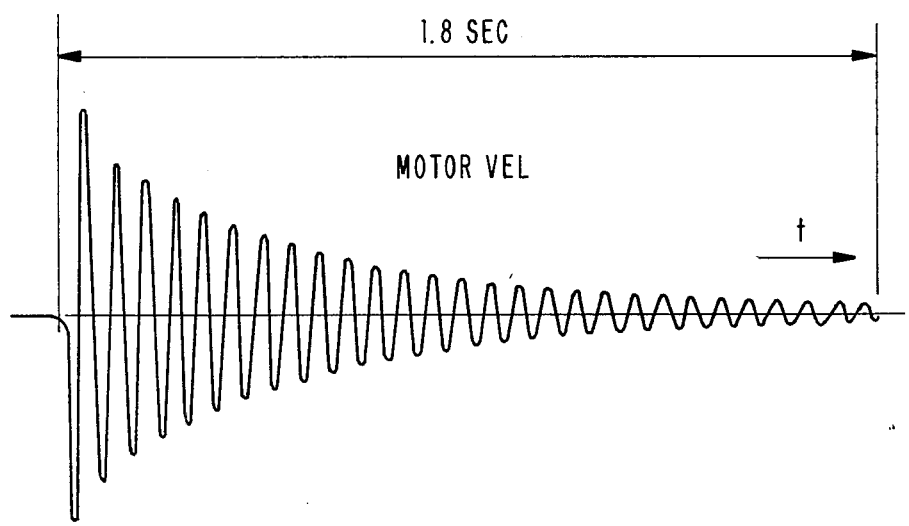

FIGS. 9-11 illustrate the efficacy of the stepper motor controlling circuitry of the invention. FIG. 9 shows the manner in which the motor speed of a certain constructed embodiment of the invention varies with the variation of the error voltage $V_{174}$ when the transducer 116 is applied onto the disk thus loading the disk. It will be observed from FIG. 9 that the motor speed and error voltage return to normal in about 80 milliseconds (time $T_1$). FIG. 10 illustrates the motor speed variations with respect to time when the transducer 116 is applied to the disk 114, and FIG. 11 is on the same scale as FIG. 10 and illustrates the manner in which the motor speed varies without the feedback of the error voltage $V_{174}$ to the system, the showing in FIG. 11 thus being the conventionally obtained results without feedback.

Figure 12:
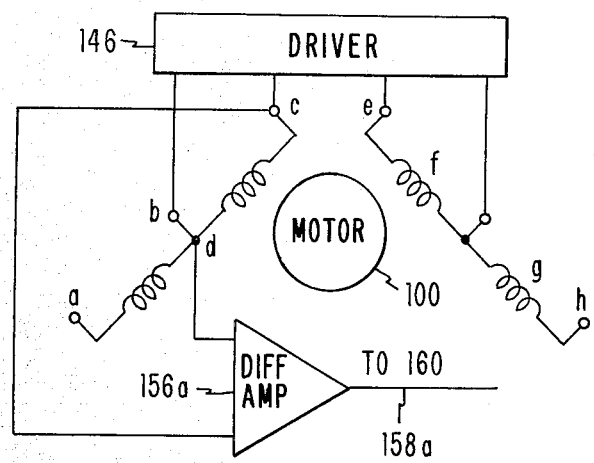
FIGS. 12, 13 and 14 show alternate driver-stepper motor coil connections that may be used.
Figure 13:
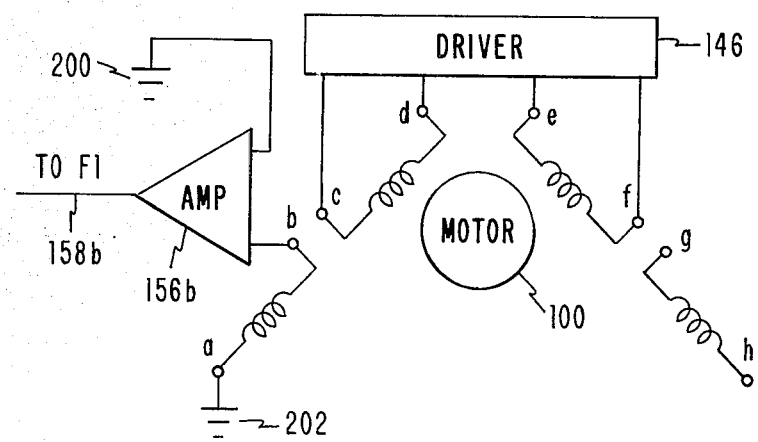
Figure 14:
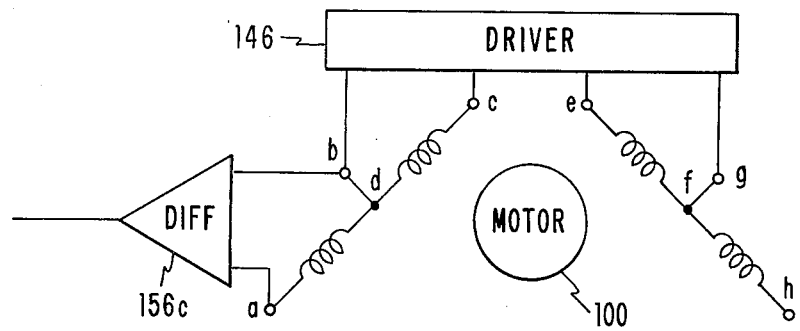

In lieu of the connections to the coils W, X, Y and Z as illustrated in FIG. 2, the connections shown in FIG. 12 may be used. The differential amplifier 156a corresponding to the differential amplifier 156 is connected to the terminals c and b, and the terminals b and d are connected together. FIG. 13 shows other alternate motor connections in which the differential amplifier 156b corresponding to amplifier 156 has its two inputs connected to the terminal b and to ground 200. The terminal a is grounded at 202. FIG. 14 shows still other alternate motor connections in which terminals a and b are connected to differential amplifier 156c corresponding to amplifier 156. Terminals f and g are connected together, and terminals b and d are connected together. The FIG. 2 circuitry as modified with the alternate motor connections shown in FIGS. 12, 13 and 14 functions in the same manner as has been previously described.

Figure 15:
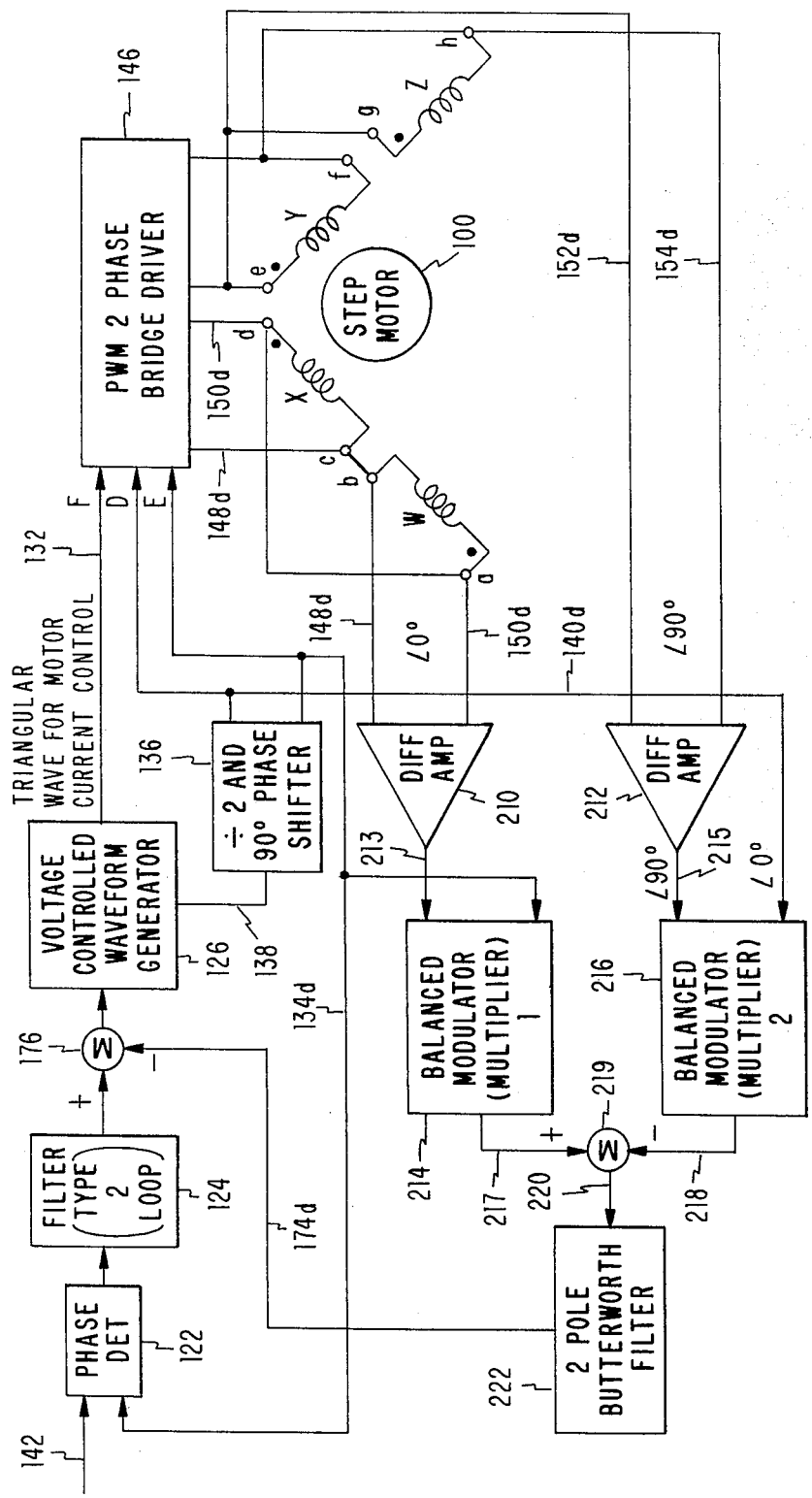
FIG. 15 is a diagram showing circuitry incorporating the principles of the invention and which may be substituted for the FIG. 2 circuitry.

The embodiment of the circuitry shown in FIG. 15 includes many of the same components as the FIG. 2 circuitry including the phase detector 122, the filter 124, the summing junction 176, the voltage controlled waveform generator 126 and the bridge driver 146. THe driver 146 has its output terminals 148d, 150d, 152d and 154d, corresponding to the terminals 148, 150, 152 and 154 of the FIG. 2 embodiment connected to the terminals a, b, c, d, e, f, g and h as shown in FIG. 15 so that the stepper motor 100 is driven in substantially the same manner as with the FIG. 2 circuitry. In the FIG. 15 circuitry, the two differential amplifiers 210 and 212 are provided in lieu of the single differential amplifier 156. The differential amplifier 210 is connected by means of the leads 148d and 150d with the terminals a and b, and the differential amplifier 212 is connected by means of the leads 152d and 154d to the terminals e and f. The output of the differential amplifier 210 is connected by means of a lead 213 with a multiplier 214, and the multiplier 214 also has the lead 134d as a second input. The output of the differential amplifier 212 is connected by means of a lead 215 to a multiplier 216, and the multiplier 216 has the lead 140d as a second input. The outputs of the multipliers 214 and 216 are connected respectively by leads 217 and 218 with a summing junction 219, the output of which is connected by lead 220 with a two pole Butterworth filter 222. The Butterworth filter 222 provides an error signal on a lead 174d (corresponding to the lead 174 in the FIG. 2 circuitry) which is connected with the summing junction 176.

The FIG. 15 circuitry provides a reduction in filter requirements in comparison with the FIG. 2 circuitry.

No low pass filter 160 is required; and, in lieu of the three pole low pass Butterworth filter 172, the relatively simple two pole Butterworth filter 222 is used. This is accomplished basically by using the second differential amplifier 212, which is responsive to the voltage across the winding Y, in additioin to the differential amplifier 210 (corresponding to the differential amplifier 156) for sensing the voltage across the winding X. The two modulators 214 and 216, in lieu of the single modulator 168, and the summing of the outputs of the two modulators 214 and 216 achieve cancellation of undesirable frequency components in the synchronous detection process. This cancellation of such components may be illustrated using the following approximate equation:

$$V_{213} = K_2 \sin \omega t + K_3 \sin (\omega t + \theta) \tag{7}$$

This equation shows the voltage on the line 213 following the differential amplifier 210 which is responsive to the voltage on the winding X. This equation corresponds to equation (1) above; and, using the same analysis as given above in connection with equation (1), the following equation may be derived for the voltage on line 217:

$$V_{217} = \frac{K_1 K_2}{2} \sin (2\omega t) + \frac{K_1 K_3}{2} \sin (2\omega t + \theta) + \frac{K_1 K_3}{2} \sin \theta \tag{8}$$

The voltage across the winding Y is 90° out of phase with respect to that across the winding X, and the voltage on the line 215 thus is as follows:

$$V_{215} = K_4 \cos \omega t + K_5 \cos (\omega t + \theta) \tag{9}$$

The voltage $V_{215}$ is multiplied by the voltage $V_{140d}$ (on terminal D) by multiplier 216, and the voltage $V_{140d}$ is as follows:

$$V_{140d} = K_1 \sin \omega t \tag{10}$$

This multiplication results in:

$$V_{218} = \frac{K_4 K_1}{2} \sin 2\omega t + \frac{K_5 K_1}{2} \sin(2\omega t + \theta) + \frac{K_5 K_1}{2} \sin(-\theta) \tag{11}$$

Now, adjusting $K_2 = K_4$ and $K_3 = K_5$ and subtracting $V_{218}$ from $V_{217}$ leaves:

$$V_{220} = \frac{K_1 K_3}{2} [\sin \theta - \sin(-\theta)] = K_1 K_3 \sin \theta \tag{12}$$

Equation 12 for small phase lags, is:

$$V_{220} = K_1 K_3 \theta \tag{13}$$

No filtering for the $2\omega$ is required in the FIG. 15 circuitry as was accomplished by filter 172 in the FIG. 2 embodiment. Terms of the mixing signals $V_{134d}$ (on terminal E) and $V_{140d}$ (on terminal D) not considered in the above simple derivation will still generate low amplitude mixer components which must be filtered (by filter 222); however, this filtering requirement can be further reduced by feeding the multipliers 214 and 216 with triangular waves generated in the voltage controlled triangular wave generator 126 of phase and frequency the same as and in place of voltages $V_{134d}$ and $V_{140d}$ respectively.

Having thus described the invention, what is claimed as new, and desired to be secured by Letters Patent is:

1. In combination,
   an electrical stepping motor having a plurality of motor coils and a rotatable armature,
   a driver including switching circuitry and connected with said motor coils for consecutively applying an EMF to said motor coils on switching of the driver to cause rotation of said armature,
   an oscillator,
   a phase locked loop circuit driven by said oscillator and including a voltage controlled wave generator having a plurality of output connections to said driver to drive the driver so that the driver causes consecutive energization of said motor coils for driving said armature,
   a control connection connected with one of said motor coils for providing a voltage which is the composite of the back EMF in said motor coil and the drive EMF applied to said coil from said driver,
   a multiplier circuit having said control connection and one of said loop circuit output connections connected to it as inputs to thereby provide an error output signal, and
   means for applying said error output signal to a point in said phase locked loop circuit so that said driver effectively holds the speed of said armature within close limits.

2. The combination as set forth in claim 1, said control connection connected with one of said motor coils including a difference amplifier connected across this motor coil.

3. The combination as set forth in claim 1, said phase locked loop circuit including a phase detector and including also a filter connected in series with and between said phase detector and said voltage controlled wave generator.

4. The combination as set forth in claim 1, said phase locked loop circuit including a phase detector and including also a filter connected in series with and between said phase detector and said voltage controlled wave generator, and a connection between one of said output connections and said phase detector for providing an input to said phase detector from said last named output connection.

5. The combination as set forth in claim 1, said phase locked loop circuit including a phase detector and including also a filter connected in series with and between said phase detector and said voltage controlled wave generator, and a connection between one of said output connections and said phase detector to provide an input to the phase detector, said point in said phase locked loop circuit to which said error output signal is applied including a summing junction between said filter and said voltage controlled wave generator.

6. The combination as set forth in claim 1, said control connection with one of said motor coils including a difference amplifier connected across this motor coil and including also a low pass filter in series between said difference amplifier and said multiplier circuit.

7. The combination as set forth in claim 1 and including a low pass filter connected in series between said multiplier circuit and said point in said phase loop circuit at which at said error output signal is applied.

8. The combination as set forth in claim 1, said control connection including a difference amplifier connected across one of said motor coils, a low pass filter connected in series between said difference amplifier and said multiplier circuit, and a low pass filter connected between multiplier circuit and said point at which said error output signal is applied to said phase locked loop circuit.

9. The combination as set forth in claim 1, said output connections to said driver from said voltage controlled wave generator including a connection provided with an analog triangular voltage wave for motor current control and a connection provided with a digital square voltage wave for driver phase shifting and said connection with said square voltage wave constituting said one of said loop circuit output connections connected to said multiplier circuit as an input.

10. The combination as set forth in claim 9, said control connection connected with one of said motor coils including a difference amplifier connected across this motor coil.

11. The combination as set forth in claim 9, said control connection connected with one of said motor coils including a difference amplifier connected across this motor coil and a low pass filter connected between said difference amplifier and said multiplier circuit, said combination including also a low pass filter connected in series between said multiplier circuit and said point in said phase locked loop circuit to which said error output signal is applied.

12. The combination as set forth in claim 1 and including a second control connection connected with another of said motor coils for providing a voltage which is the composite of the back EMF in this motor coil and the drive EMF applied to this coil from said driver and a second multiplier circuit having said last named control connection and one of said loop circuit output connections connected to it as inputs, and a summing junction having the outputs of said two multiplier circuits connected to it for thereby providing said error output signal to said point in said phase locked loop circuit.

13. The combination as set forth in claim 12, each of said control connections including a difference amplifier which is connected across the respective one of said motor coils to which the particular control connection is connected.

14. The combination as set forth in claim 13, and including a filter connected between said summing junction and said point in said phase locked loop circuit at which said error output signal is applied.

15. The combination as set forth in claim 12, said plurality of output connections to said driver from said voltage controlled wave generator including an output connection having an analog triangular voltage wave thereon for motor current control and a pair of output connections having out of phase square voltage waves thereon for driver phase switching and said two coils to which said control connections are connected being such as to have out of phase voltages across them, one of said loop circuit output connections carrying a square wave voltage being connected as an input to one of said multiplier circuits and the other of said loop circuit output connections carrying a square wave voltage being connected as an input to the other of said multiplier circuits.

* * * * *